United States Patent [19]

Brown et al.

[11] 4,429,844

[45] Feb. 7, 1984

[54] VARIABLE CAMBER AIRCRAFT WING TIP

[75] Inventors: Stephen T. Brown, Bellevue; Frank D. Statkus, Woodinville, both of Wash.

[73] Assignee: The Boeing Company, Seattle, Wash.

[21] Appl. No.: 451,216

[22] PCT Filed: Sep. 29, 1982

[86] PCT No.: PCT/US82/01354

§ 371 Date: Sep. 29, 1982

§ 102(e) Date: Sep. 29, 1982

[51] Int. Cl.³ .............................................. B64C 3/48
[52] U.S. Cl. .................................................. 244/219
[58] Field of Search ................... 244/130, 134 A, 198, 244/199, 200, 201, 213, 214, 219

[56] References Cited

U.S. PATENT DOCUMENTS

| | | | |
|---|---|---|---|
| 1,203,558 | 10/1916 | Gallaudet . | |
| 1,567,531 | 12/1925 | Magni . | |
| 1,731,666 | 10/1929 | Jackson | 244/214 |
| 1,747,637 | 2/1930 | Larsen . | |
| 2,022,806 | 12/1935 | Grant | 244/12 |
| 2,820,601 | 1/1958 | Crawford | 244/90 |
| 3,152,775 | 10/1964 | Boyd | 244/13 |
| 4,351,502 | 9/1982 | Statkus | 244/214 |

FOREIGN PATENT DOCUMENTS

| | | |
|---|---|---|
| 568605 | 7/1923 | France . |
| 251868 | 2/1928 | Italy . |

Primary Examiner—Trygve M. Blix
Assistant Examiner—Rodney Corl
Attorney, Agent, or Firm—Eugene O. Heberer

[57] ABSTRACT

A variable wing tip (18) for securing to a variable camber leading edge portion (12) of an aircraft wing (10). The wing tip has a normal fore and aft camber in an upper position and is adapted to have an increased camber curvature in a deflected down position. In the down position, the wing tip has a compound curvature, is shortened in the fore and aft direction ad is generally thickened in depth in a substantial portion of the wing tip. By operation of an actuator (96) in the leading edge (21), a multiple of generally parallel scissor plates (30,32) are pivoted apart. The plates extend in an inboard outboard direction and are spaced in the fore and aft direction. The scissor plates are pairs of upper and lower plates with respect to the upper and lower surface of the wing tip, the upper plates (30) being adapted to be pivotally secured inboard to a complementary outer portion of the wing leading edge to secure the upper portion of the wing tip thereto, and the lower plates (32) being pivotally and slidably secured inboard within the wing tip and being adapted to be secured to a complementary outer portion of the wing leading edge to secure the lower portion of the wing tip thereto. Each respective pair of upper and lower plates are pivotally secured together outboard (40) adjacent and outboard leading edge (42) of the wing tip. Respective upper and lower plates are adapted to be pivoted apart inwardly of and on the outboard pivots (40) when the camber is increased in the down position so as to increase the depth of and shorten the fore and aft direction of the wing tip. An elastomer (84) is bonded to the plates, permitting the plates to be pivoted apart. An elastomeric wing tip configuration (88), is secured to the wing leading edge and to a forwardly facing edge of the wing. The elastomeric configuration has the normal camber of the wing tip in the upper position and the increased camber and compound curvature of the wing tip in the deflected position. It forms continuous surfaces in the varied camber positions with the wing.

38 Claims, 9 Drawing Figures

Fig. 2

VARIABLE CAMBER AIRCRAFT WING TIP

DESCRIPTION

The government has rights in this invention pursuant to contract No. F33615-78-C-3027 awarded by the U.S. Air Force.

TECHNICAL FIELD

This invention relates to variable camber aircraft wing tips useful in mission adaptive wings which are being designed with the capability to reconfigure airfoil geometry in flight and to improve aerodynamic performance throughout that envelope.

BACKGROUND ART

The aerodynamic design of modern aircraft is a compromise between many conflicting requirements, thus limiting near optimum aerodynamic performance to a small portion of the aircraft flight envelopes. In the use of mission adaptive wing technology, sizable improvements in payload range, maneuverability, and ride quality are made possible.

One technical approach to the mission adaptive wing involves the use of variable camber leading and trailing edge flaps having smooth upper surface flexible panels. The panels are adapted to change shape when the flaps are deflected during flight. It is of particular interest to adapt the mission adaptive wing to a variety of wing planform geometries.

Specifically, in the area of wing tips, compound curvature prevents the use of a prior art basic variable camber actuation system, and a more sophisticated method of closing out a wing leading edge flap is required. Whereas a variable camber wing tip is not specifically required for a fixed wing application, it is a definite requirement for a variable sweep wing, and is aerodynamically desirable for fixed wings using variable camber leading edges.

The only known prior attempt to make a variable camber wing tip was in the form of a solid plug deflectable with respect to the surrounding wing structure. This type of wing tip presented large discontinuities between the tip and adjacent wing structure in all deflected positions. The large discontinuities resulted in high drag to the extent that the wing tip design was considered to be unsatisfactory.

A search of the patent literature discloses a number of variable camber wing structures which are not directly pertinent. French Pat. No. 568,605 illustrates a variable camber wing that does not have a compound curvature in the deflected position. Similarly, U.S. Pat. No. 1,747,637 teaches a variable camber wing that is increased in thickness when the camber is increased but it also does not teach a compound curvature.

The following patents disclose various forms of wing structures:
U.S. Pat. No. 1,203,558
U.S. Pat. No. 1,567,531
U.S. Pat. No. 2,022,806
U.S. Pat. No. 2,820,601
U.S. Pat. No. 3,152,775
Italian Pat. No. 251,868

DISCLOSURE OF THE INVENTION

The invention is a variable camber wing tip and such wing tip in combination with an aircraft wing having variable camber leading and trailing flaps. The wing tip has normal or nominal camber in an upper position and is adapted to have an increased camber curvature in a deflected down position. The wing tip has a fore and aft extending end secured along a complementary outer end of a variable camber leading edge of the wing and a trailing edge of the wing tip extends along a fixed outboard forwardly facing edge of the wing. The wing tip in the down position has a compound curvature, that is, curving forwardly downwardly and outboardly downwardly, and being shortened in the fore and aft direction and generally thickened.

There are means within the wing tip adapted to be actuated by means within the wing leading edge portion to vary the camber from the upper position to the down deflected position and return.

The wing tip is generally triangular in plan and has a leading edge which is adapted to be generally at an acute angle with the leading edge of the aircraft wing. The means, within the wing tip when actuated to vary the camber in the down position, increases the depth of the wing tip and shortens it in the fore and aft direction and creates the compound curvature.

The actuatable means in the wing tip include multiple, generally parallel scissor plates, extending in an inboard-outboard direction and spaced in the fore and aft direction. The scissor plates are upper and lower plates with respect to the upper and lower surfaces of the wing tip. The upper plates are pivotally secured inboard to the wing variable camber leading edge so as to secure an upper portion of the wing tip to the wing. The lower plates are pivotally and slidably secured inboard within the wing tip and to the wing leading edge to secure a lower portion of the wing tip to the wing.

The upper and lower scissor plates are pivotally secured together outboard adjacent an outboard leading edge of the wing tip, which leading edge is adapted to be generally at an acute angle with the leading edge of the wing. The upper and lower plates are adapted to be pivoted apart inwardly of and on the outboard pivots when the camber is increased to the down position, at which time the depth of the wing tip is increased.

An elastomer is bonded to respective upper, lower and outer end surfaces of the respective upper and lower plates, permitting the plates to be pivoted apart. The upper, lower, and outer end surfaces with the elastomer generally form a wing tip configuration. There is an elastomeric wing tip skin integral with the above elastomer, the upper surface being covered with a bonded fabric. The elastomer and fabric are secured to the variable camber leading edge and to a forwardly facing edge of the wing, the elastomer having the normal or nominal camber of the wing tip in the upper position and having the increased camber compound curvature of the wing tip in the deflected position, the elastomer wing tip and wing forming continuous surfaces in the varied camber positions. The elastomer is bonded to the plates with the wing tip in a partially deflected position to minimize any waviness in the lower surface of the wing tip during deflection.

The invention includes the following advantages:
1. It eliminates the drag problems of the prior art.
2. It provides extremely good contour capability with adjacent structure at all flap positions.
3. It is adaptable to any variable camber leading edge application.

4. It has a simple but rigid structure due to the number of scissor plates.
5. It is not dependent on wing planform or size.
6. It is capable of subsonic and supersonic applications.
7. It is capable of carrying high loads without deformation.
8. It is suitable for trailing edge variable camber flap closeout.

Further advantages of the invention may be brought out in the following part of the specification wherein small details have been described for the competence of the disclosure, without intending to limit the scope of the invention which is set forth in the appended claims.

BRIEF DESCRIPTION TO THE DRAWINGS

Referring to the accompanying drawings, which are for illustrative purposes.

BEST MODE FOR CARRYING OUT THE INVENTION

Referring again to the drawings, there is shown in FIGS. 1–3 and 9 an aircraft mission adaptive wing 10, having a variable camber leading edge 12, variable camber trailing flaps 14 and a fixed central portion 16. The wing has a variable camber wing tip 18 structurally secured to the leading edge 12, to forwardly facing edges 22 and 26 of the fixed wing portion 16, and to an outboard generally fore and aft edge 24 of the leading edge 12.

Figure 9:
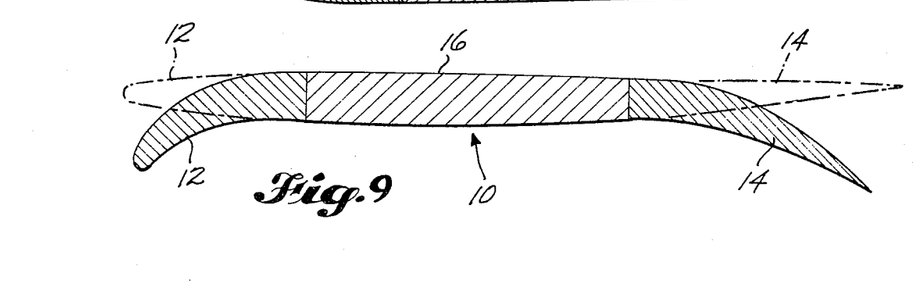
FIG. 9 is a cross-sectional view of a mission adapted wing using variable camber leading and trailing flaps.

Whereas FIG. 9 does not include the wing tip, it illustrates general operation of a mission adaptive wing using variable camber leading edges and trailing flaps 12 and 14, respectively. Leading edge 12 and the flaps 14, shown in full lines, are in the deflected down position in which the camber curvature is substantially increased. The leading edge 12 and the flaps 14 in broken lines show the nominal camber of the wing.

Internal structure, according to the invention, of the wing tip 18 is best seen in FIGS. 2–7. The basic structure of the wing tip is comprised of a plurality of upper and lower scissor plates 30 and 32, respectively, extending in the inboard outboard direction and being spaced fore and aft. The plates have elongated upwardly extending generally vertical walls, each having T-bars 34, 36 spaced from each other vertically at their inner ends. The plates are pivotally connected at their outboard ends by pivots 40 to form the scissors.

Figure 1:
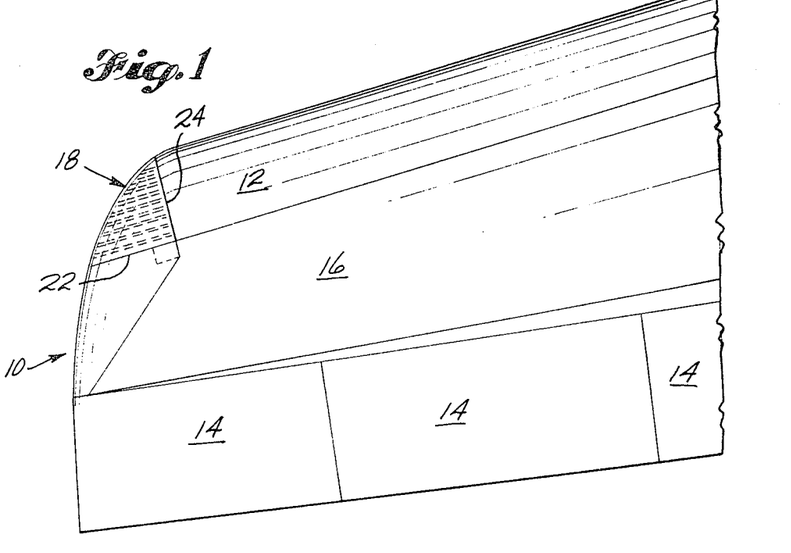
FIG. 1 is a fragmentary plan view of an aircraft wing including a wing tip according to the invention.
Figure 2:
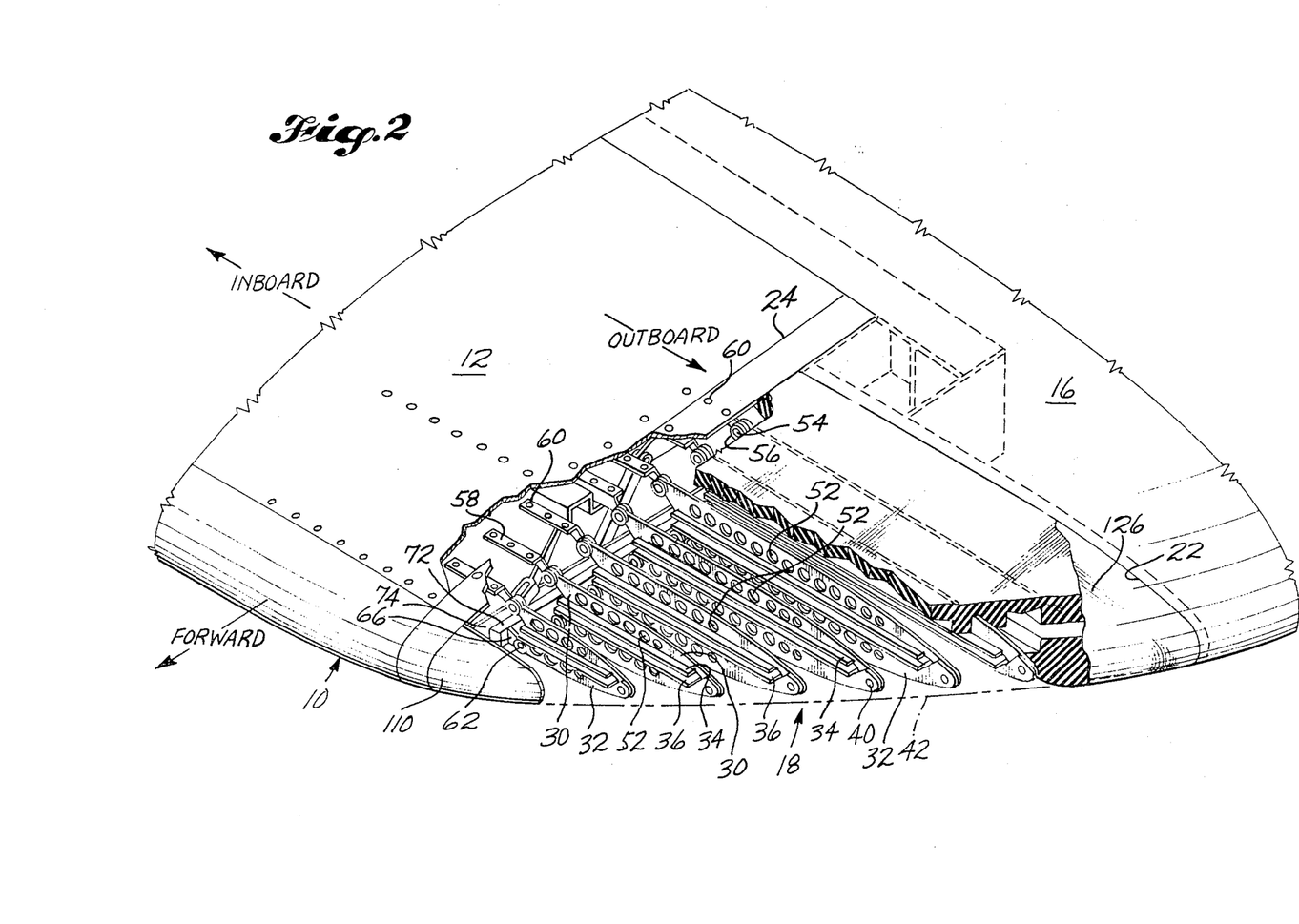
FIG. 2 is a pictorial view of the wing tip with portions cut away to illustrate the internal structure.
Figure 3:
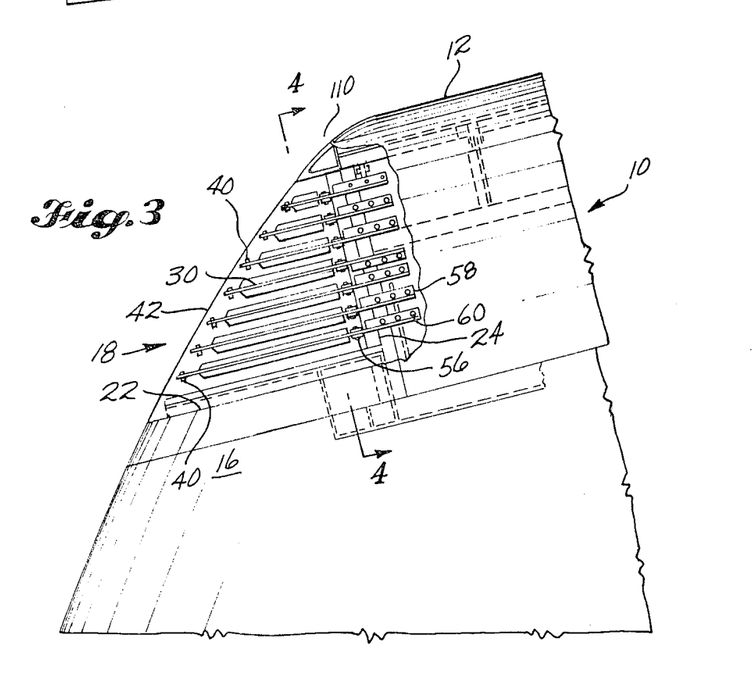
FIG. 3 is a plan view of the upper side of the wing tip without a cover.

As best seen in FIGS. 2 and 3, the scissor plates increase in length from fore to aft, and along their outboard ends there is a line 42 formed, generally at an acute angle with the forward face of the leading edge 12. The line 42 and the inboard and trailing surfaces adjacent the other wing portions form a generally triangular configuration in plan.

Figures 4, 5, 6, 7:
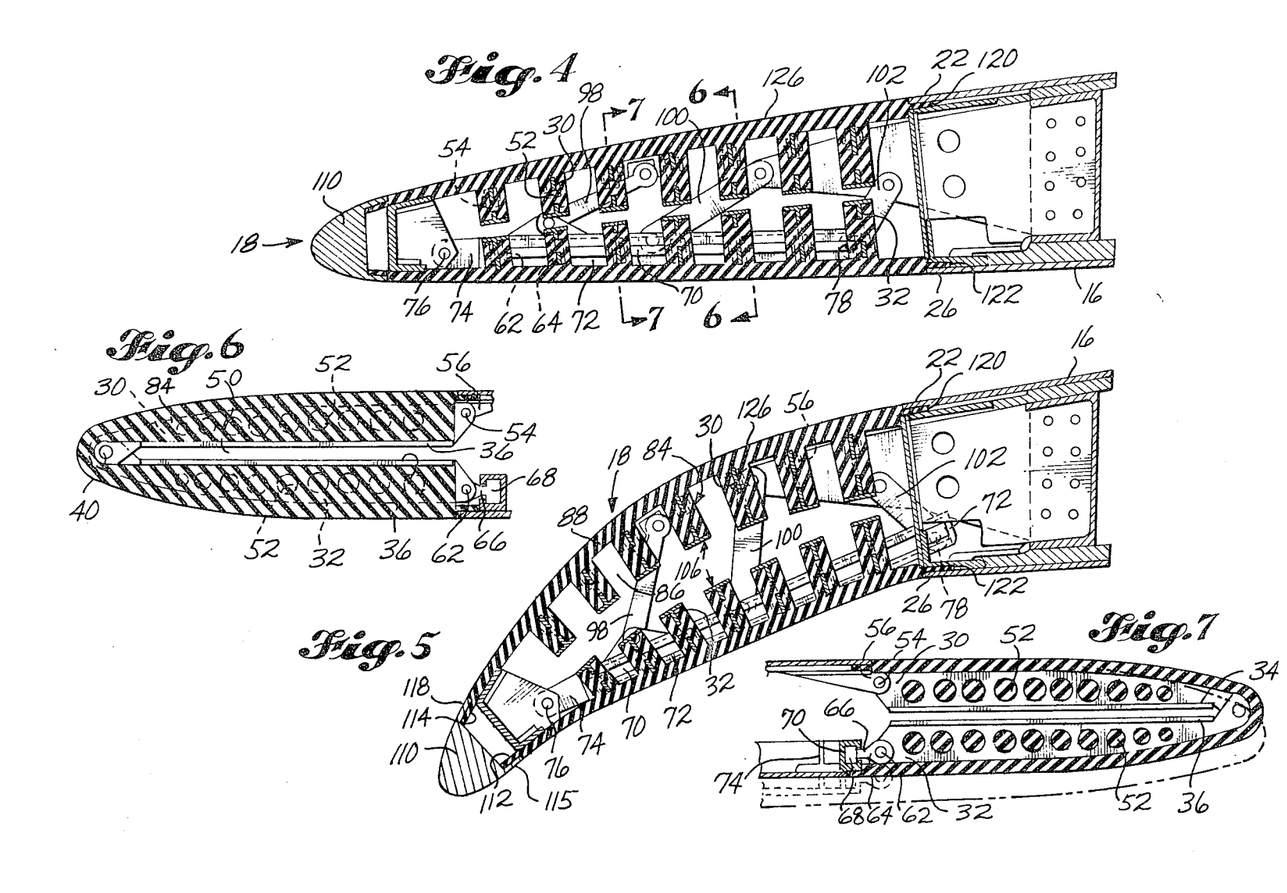
FIG. 4 is a cross-sectional view of the wing tip in an upper, non-deflected position, taken along the line 4—4 in FIG. 3.
FIG. 5 is a cross-sectional view of the wing tip, shown in FIG. 4, illustrating the deflected forwardly downwardly configuration.
FIG. 6 is a side elevational view of a pair of scissor plates having an elastomer bonded thereto and forming the wing tip, taken along the line 6—6 in FIG. 4.
FIG. 7 is a side elevational view of a pair of scissor plates, without the elastomer, taken along the line 7—7 in FIG. 4, and illustrating in phantom outline, the action of the scissor plates in the outboardly downwardly deflection of the wing tip as shown in FIG. 5.

In FIGS. 4 and 6 where the camber of the wing tip is in its nominal form, that is, non-deflected, the T-bars 34, 36 on the inner ends of the plates 30 and 32 are spaced apart, as indicated at 50. The plates have a series of circular openings 52, spaced in the inboard and outboard direction. The upper plates are pivotally secured at 54 within a clevis 56. The clevises 56, FIGS. 2 and 3, have metal strips 58 extending inboard into the wing leading edge 12 to which they are secured by fasteners 60.

The lower scissor plates 32 are pivotally connected at 62 to clevises 64, FIG. 7. A short rod 66 connects each clevis 64 to substantially rectangular block 68. The blocks 68 are slidably engaged in a groove 70 in a bar 72 within the wing tip at the inboard end. The grooved bar 70 is secured to a variable camber linkage draw bar 74, pivotally engaged at 76 and 78 to the actuator linkage system within the leading edge 12 for varying the camber of the leading edge 12 and the camber of the wing tip.

The upper and lower plates 30 and 32 are further secured together by an elastomer, such as silicone rubber, generally designated as 84. The elastomer is bonded to the outer surfaces of the bars of the T's at the inner end of the plates and embedded in the openings 52 in the plates, extending outwardly on the plates, having spaces 86 therebetween. The elastomer further extends over the outer end of the plates around and over the pivots 40 and forms an upper and lower wing tip structure 88 at the respective upper and lower ends of the plates to form a continuous wing tip configuration. The elastomer 84 is bonded to the plates in a partially deflected position so as to minimize any waviness in the lower surface of the tip during deflection.

In FIGS. 5 and 7, the wing tip is shown in the deflected forwardly down position, FIG. 5 looking inboard and in FIG. 7 in phantom outline in the outboardly down position looking rearwardly. The view in FIG. 5 and the phantom outline in FIG. 7 illustrate the compound curvature in the down position. A rotary actuator 96, FIG. 8, through a linkage system in the leading edge 12 of the wing rotates the links 98, 100 and 102 from the positions shown in FIG. 4 to the positions shown in FIG. 5. This rotation pivots the bar 74 at 76 and 78 and the grooved member 72 to actuate the scissor plates and the elastomer so as to vary the camber to increase its curvature and deflect the wing tip downwardly.

In this process the inner ends of the scissor plates are spaced apart, from the space 50 in FIG. 6, to a greater space 106 in FIG. 5 so as to generally and substantially increase the depth of the wing tip. The wing tip is also shortened in the fore and aft direction. During this operation, the bars 68 slide in the groove 70 in the member 72 to permit the compound curvature of the wing tip in the shortening thereof and the increase of its depth. The compound curvature is made possible by the arrangement of the scissor plates and the elastomer 84 which is bonded to them and which moves with them to maintain proper wing tip configuration in the deflected position and in return to the nominal camber position in FIG. 4.

Adjacent the forward inboard end of the wing tip, there is a fixed aluminum leading end 110, attaches to the outboard end of the leading edge 12. Leading end portions 112 and 114, FIGS. 4 and 5, of the elastomer 84 are reinforced with fiberglass and extend into wing part 110 and are fastened to plates 115 and 118, respectively. Similarly, trailing end portions 120 and 122 are reinforced with fiberglass and extend along the forwardly facing edges 22 and 26 of the wing portion 16 to which they are fastened. The upper surface of the wing tip elastomer has a thin sheet 126 of fabric integrally bonded thereon for reinforcement. The resulting wing tip conforms identically to the shape of the adjacent variable camber leading edge and fixed wing portion at any flap position.

Figure 8:
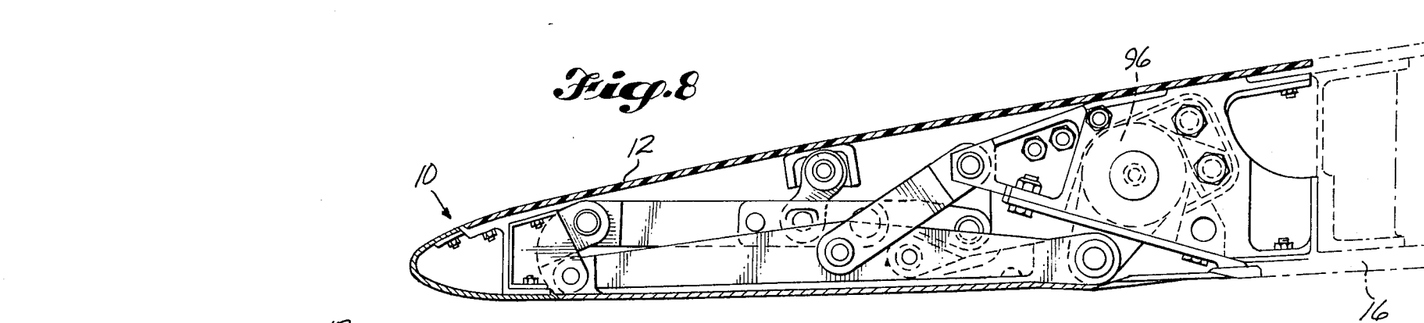
FIG. 8 is a side elevational view of a variable camber leading edge of the wing taken just inboard of the wing tip, and illustrating variable camber actuating means for the leading edge of the wing and for the wing tip.

The rotary actuator 96 within the wing leading edge 12 is connected by a series of links, not shown, to the links 98, 100 and 102. Thus, when it rotates counter-clockwise the three links 98, 100 and 102 rotate the bar 74 within the wing tip so that a flat surface is maintained at the bottom of the wing tip, and the compound curvature between the scissor plates and the shortened the wing tip occurs.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

We claim:

1. A variable wing tip adapted to be secured to a variable camber leading portion of an aircraft wing, said wing tip comprising;
    an inboard generally fore and aft extending end of the wing tip being adapted to be secured along a complementary outer end of a variable camber leading edge portion of the wing;
    a trailing edge of the tip being adapted to extend along a fixed outboard forwardly facing edge of the wing;
    said wing tip having a normal fore and aft camber in an upper position and being adapted to have an increased camber curvature in a deflected down position;
    said wing tip in the down position being shortened in the fore and aft direction and being generally thickened in depth in a substantial portion thereof, and having a compound curvature, curving forwardly and outboardly downwardly; and
    means within the wing tip adapted to be actuated to vary the camber from the upper position to the down position and return.

2. The invention according to claim 1 in which: said wing tip is generally triangular in plan.

3. The invention according to claim 1 in which: said wing tip has a leading edge which is adapted to be generally at an acute angle with the leading edge of the wing.

4. The invention according to claim 1 in which:
    said means include multiple, generally parallel scissor plates, extending in an inboard-outboard direction and spaced in the fore and aft direction;
    said scissor plates being pairs of upper and lower plates with respect to upper and lower surfaces of the wing tip, the upper plates being adapted to be pivotally secured inboard to the complementary outer portion of th wing leading edge to secure an upper portion of the wing tip thereto, the lower plates being pivotally and slidably secured inboard within the wing tip and being adapted to be secured to the complementary outer portion of the wing leading edge to secure a lower portion of the wing tip thereto;
    each respective pair of upper and lower plates being pivotally secured together outboard adjacent an outboard leading edge of the wing tip, said wing tip leading edge being adapted to be generally at an acute angle with the leading edge of the wing.

5. The invention according to claim 4 in which:
    said respective pairs of upper and lower plates being adapted to be pivoted apart inwardly of and on said outboard pivots when the camber is increased to the down position, increasing the depth of the wing tip.

6. The invention according to claim 5 in which:
    an elastomer is bonded to portions of the plates, permitting the plates to be pivoted apart;
    said upper and lower plates having respective upper, lower, and outboard end surfaces generally forming a wing tip configuration;
    said elastomer being bonded to said respective upper, lower, and outboard end surfaces of said plates to form portions of said configuration.

7. The invention according to claim 6 including:
    an elastomeric wing tip outer surface formed as the outer surface portion of said configuration including said elastomer;
    said outer surface portion being adapted to be secured to said wing leading edge portion and to said forwardly facing edge of the wing;
    said outer surface portion having the normal camber of the wing tip in the upper position and having the increased camber curvature of the wing tip in the deflected position; the outer surface portion and wing being adapted to form continuous surfaces in the varied camber positions.

8. The invention according to claim 7 in which:
    said elastomer is bonded to said plates with the wing tip in a partially deflected position to minimize any waviness in the lower surface of the wing tip during deflection.

9. In an aircraft wing, a variable camber wing tip forming an outboard and forward portion of said wing, said wing tip comprising:
    an inboard generally fore and aft extending end of the wing tip being secured along a complementary outer end of a variable camber leading edge portion of the wing;
    a trailing edge of the wing tip extending along a fixed outboard forwardly facing edge of the wing;
    said wing tip having a normal camber on its upper surface in an upper position and being adapted to have an increased camber curvature in a deflected down position;

said wing tip in the down position having a compound curvature between the upper cambered surface and its lower surface, the wing tip being curved downwardly forwardly and outboardly in the down position; and means within the wing tip adapted to be actuated to vary the camber from the upper portion to the down position and return.

10. The invention according to claim 9 in which:

said wing tip is generally triangular in plan.

11. The invention according to claim 9 in which:

said wing tip has a leading edge which is generally at an acute angle with the leading edge of the wing.

12. The invention according to claim 9 in which:

said means, when actuated to vary and increase the camber to the down position, generally increases the depth of the wing tip and shortens the wing tip in the fore and aft direction.

13. The invention according to claim 9 in which:

said means include multiple, generally parallel and generally vertical scissor plates, extending in an inboard-outboard direction and spaced in the fore and aft direction;

said scissor plates being pairs of upper and lower plates with respect to upper and lower surfaces of the wing tip, the upper plates being pivotally secured inboard to the complementary outer portion of the wing leading edge to secure an upper portion of the wing tip thereto, the lower plates being pivotally and slidably secured inboard within the wing tip and being secured to the complementary outer portion of the wing leading edge to secure a lower portion of the wing tip thereto;

each respective pair of upper and lower plates being pivotally secured together outboard adjacent an outboard leading edge of the wing tip, said leading edge being generally at an acute angle with the leading edge of the wing.

14. The invention according to claim 13 in which:

said respective pairs of upper and lower plates being adapted to be pivoted apart inwardly of and on said outboard pivots when the camber is increased to the down position, increasing the depth of the wing tip.

15. The invention according to claim 14 in which:

an elastomer is bonded to portions of the plates, permitting the plates to be pivoted apart;

said upper and lower plates having respective upper, lower, and outboard end surfaces generally forming a wing tip configuration;

said elastomer being bonded to said respective upper, lower, and outboard end surfaces of said plates to form portions of said configuration.

16. The invention according to claim 15 including:

an elastomeric wing tip outer surface formed as the outer surface portion of said configuration including said elastomer;

said outer surface portion having the normal camber of the wing tip in the upper position and having the increased camber curvature of the wing tip in the deflected position; the outer surface portion and wing forming continuous surfaces in the varied camber positions.

17. The invention according to claim 16 in which:

said elastomer is bonded to said plates with the wing tip in a partially deflected position to minimize any waviness in the lower surface of the wing tip during deflection.

18. A variable camber wing tip being adapted to be secured to an outboard and forward portion of an aircraft wing, comprising:

an inboard generally fore and aft extending end of the wing tip being adapted to be secured along a complementary outer end of the wing;

a trailing edge of the tip being adapted to extend along a fixed outboard forwardly facing edge of the wing;

said wing tip having a normal camber in an upper position and being adapted to have an increased camber curvature in a deflected down position; and means within the wing tip adapted to be actuated to vary the camber from the upper position to the down position and return;

said means, when actuated to vary and increase the camber to the down position, curve the wing tip downwardly forwardly and outboardly to have a compound curvature.

19. The invention according to claim 18 in which:

said means include multiple, generally parallel scissor plates, extending in an inboard-outboard direction and spaced in the fore and aft direction;

said scissor plates being pairs of upper and lower plates with respect to upper and lower surfaces of the wing tip, the upper plates being adapted to be pivotally secured inboard to the complementary outer portion of the wing to secure an upper portion of the wing tip thereto, the lower plates being pivotally and slidably secured inboard within the wing tip and being adapted to be secured to the complementary outer portion of the wing to secure a lower portion of the wing tip thereto;

each respective pair of upper and lower plates being pivotally secured together outboard adjacent an outboard leading edge of the wing tip, said leading edge being adapted to be generally at an acute angle with the leading edge of the wing.

20. The invention according to claim 19 in which:

said respective pairs of upper and lower plates being adapted to be pivoted apart inwardly of and on said outboard pivots when the camber is increased to the down position, whereby the depth of the wing tip is increased.

21. The invention according to claim 20 in which:

an elastomer is bonded to portions of the plates, permitting the plates to be pivoted apart;

said upper and lower plates having respective upper, lower, and outboard end surfaces generally forming a wing tip configuration;

said elastomer being bonded to said respective upper, lower, and outboard end surfaces of said plates to form portions of said configuration.

22. The invention according to claim 21 including:

an elastomeric wing tip outer surface portion formed as the outer surface portion of said configuration including said elastomer;

said outer surface portion having the normal camber of the wing tip in the upper position and having the increased camber curvature of the wing tip in the deflected position; the outer surface portion and wing being adapted to form continuous surfaces in the varied camber positions.

23. The invention according to claim 22 in which:

said elastomer is bonded to said plates with the wing tip in a partially deflected position to minimize any waviness in the lower surface of the wing tip during deflection.

24. A variable wing tip adapted to be secured to a variable camber leading portion of an aircraft wing, said wing tip comprising:
- an inboard generally fore and aft extending end of the wing tip being adapted to be secured along a complementary outer end of a variable camber leading edge portion of the wing;
- a trailing edge of the tip being adapted to extend along a fixed outboard forwardly facing edge of the wing;
- said wing tip having a normal fore and aft camber in an upper position and being adapted to have an increased camber curvature in a deflected down position;
- said wing tip in the down position being shortened in the fore and aft direction and being generally thickened in depth in a substantial portion thereof; and
- means within the wing tip adapted to be actuated to vary the camber from the upper position to the down position and return;
- said means including multiple, generally parallel scissor plates, extending in an inboard-outboard direction and spaced in the fore and aft direction;
- said scissor plates being pairs of upper and lower plates with respect to upper and lower surfaces of the wing tip, the upper plates being adapted to be pivotally secured inboard to the complementary outer portion of the wing leading edge to secure an upper portion of the wing tip thereto, the lower plates being pivotally and slidably secured inboard within the wing tip and being adapted to be secured to the complementary outer portion of the wing leading edge to secure a lower portion of the wing tip thereto;
- each respective pair of upper and lower plates being pivotally secured together outboard adjacent an outboard leading edge of the wing tip, said wing tip leading edge being adapted to be generally at an acute angle with the leading edge of the wing.

25. The invention according to claim 24 in which:
- said respective pairs of upper and lower plates being adapted to be pivoted apart inwardly of and on said outboard pivots when the camber is increased to the down position, increasing the depth of the wing tip.

26. The invention according to claim 25 in which:
- an elastomer is bonded to portions of the plates, permitting the plates to be pivoted apart;
- said upper and lower plates having respective upper, lower, and outboard end surfaces generally forming a wing tip configuration;
- said elastomer being bonded to said respective upper, lower, and outboard end surfaces of said plates to form portions of said configuration.

27. The invention according to claim 26, including:
- an elastomeric wing tip outer surface formed as the outer surface portion of said configuration including said elastomer;
- said outer surface portion being adapted to be secured to said wing leading edge portion and to said forwardly facing edge of the wing;
- said outer surface portion having the normal camber of the wing tip in the upper position and having the increased camber curvature of the wing tip in the deflected position; the outer surface portion and wing being adapted to form continuous surfaces in the varied camber positions.

28. The invention according to claim 27 in which:
- said elastomer is bonded to said plates with the wing tip in a partially deflected position to minimize any waviness in the lower surface of the wing tip during deflection.

29. In an aircraft wing, a variable camber wing tip forming an outboard and forward portion of said wing, said wing tip comprising:
- an inboard generally fore and aft extending end of the wing tip being secured along a complementary outer end of a variable camber leading edge portion of the wing;
- a trailing edge of the wing tip extending along a fixed outboard forwardly facing edge of the wing;
- said wing tip having a normal camber on its upper surface in an upper position and being adapted to have an increased camber curvature in a deflected down position;
- said wing tip in the down position having a compound curvature between the upper cambered surface and its lower surface; and
- means with the wing tip adapted to be actuated to vary the camber from the upper portion to the down position and return;
- said means including multiple, generally parallel and generally vertical scissor plates, extending in an inboard-outboard direction and spaced in the fore and aft direction;
- said scissor plates being pairs of upper and lower plates with respect to upper and lower surfaces of the wing tip, the upper plates being pivotally secured inboard to the complementary outer portion of the wing leading edge to secure an upper portion of the wing tip thereto, the lower plates being pivotally and slidably secured inboard within the wing tip and being secured to the complementary outer portion of the wing leading edge to secure a lower portion of the wing tip thereto;
- each respective pair of upper and lower plates being pivotally secured together outboard adjacent an outboard leading edge of the wing tip, said leading edge being generally at an acute angle with the leading edge of the wing.

30. The invention according to claim 29 in which:
- said respective pairs of upper and lower plates being adapted to be pivoted apart inwardly of and on said outboard pivots when the camber is increased to the down position, increasing the depth of the wing tip.

31. The invention according to claim 30 in which:
- an elastomer is bonded to portions of the plates, permitting the plates to be pivoted apart;
- said upper and lower plates having respective upper, lower, and outboard end surfaces generally forming a wing tip configuration;
- said elastomer being bonded to said respective upper, lower, and outboard end surfaces of said plates to form portions of said configuration.

32. The invention according to claim 31 including:
- an elastomeric wing tip outer surface formed as the outer surface portion of said configuration including said elastomer;
- said outer surface portion having the normal camber of the wing tip in the upper position and having the increased camber curvature of the wing tip in the deflected position; the outer surface portion and wing forming continuous surfaces in the varied camber positions.

33. The invention according to claim 32 in which:
said elastomer is bonded to said plates with the wing tip in a partially deflected position to minimize any waviness in the lower surface of the wing tip during deflection.

34. A variable camber wing tip being adapted to be secured to an outboard and forward portion of an aircraft wing, comprising:
an inboard generally fore and aft extending end of the wing tip being adapted to be secured along a complementary outer end of the wing;
a trailing edge of the tip being adapted to extend along a fixed outboard forwardly facing edge of the wing;
said wing tip having a normal camber in an upper position and being adapted to have an increased camber curvature in a deflected down position; and
means within the wing tip adapted to be actuated to vary the camber from the upper position to the down position and return;
said means, when actuated to vary and increase the camber to the down position, generally increases the depth of a substantial portion of the wing tip;
said means including multiple, generally parallel scissor plates, extending in an inboard-outboard direction and spaced in the fore and aft direction;
said scissor plates being pairs of upper and lower plates with respect to upper and lower surfaces of the wing tip, the upper plates being adapted to be pivotally secured inboard to the complementary outer portion of the wing to secure an upper portion of the wing tip thereto, the lower plates being pivotally and slidably secured inboard within the wing tip and being adapted to be secured to the complementary outer portion of the wing to secure a lower portion of the wing tip thereto;
each respective pair of upper and lower plates being pivotally secured together outboard adjacent an outboard leading edge of the wing tip, said leading edge being adapted to be generally at an acute angle with the leading edge of the wing.

35. The invention according to claim 34 in which:
said respective pairs of upper and lower plates being adapted to be pivoted apart inwardly of and on said outboard pivots when the camber is increased to the down position, whereby the depth of the wing tip is increased.

36. The invention according to claim 35 in which:
an elastomer is bonded to portions of the plates, permitting the plates to be pivoted apart;
said upper and lower plates having respective upper, lower, and outboard end surfaces generally forming a wing tip configuration;
said elastomer being bonded to said respective upper, lower, and outboard end surfaces of said plates to form portions of said configuration.

37. The invention according to claim 36 including:
an elastomeric wing tip outer surface portion formed as the outer surface portion of said configuration including said elastomer;
said outer surface portion having the normal camber of the wing tip in the upper position and having the increased camber curvature of the wing tip in the deflected position; the outer surface portion and wing being adapted to form continuous surfaces in the varied camber positions.

38. The invention according to claim 37 in which:
said elastomer is bonded to said plates with the wing tip in a partially deflected position to minimize any waviness in the lower surface of the wing tip during deflection.

* * * * *

UNITED STATES PATENT AND TRADEMARK OFFICE
CERTIFICATE OF CORRECTION

PATENT NO. : 4,429,844

DATED : February 7, 1984

INVENTOR(S) : Stephen T. Brown et al.

It is certified that error appears in the above-identified patent and that said Letters Patent are hereby corrected as shown below:

Claim 9, column 7, line 9, "portion" should be -- position --.

Claim 18, column 8, line 19, "curve" should be -- curves --.

Claim 29, column 10, line 25, "portion" should be -- position --.

Signed and Sealed this

Twenty-fourth Day of February, 1987

Attest:

DONALD J. QUIGG

Attesting Officer    Commissioner of Patents and Trademarks